United States Patent [19]

Komori et al.

[11] Patent Number: 4,783,747
[45] Date of Patent: Nov. 8, 1988

[54] CONTROL DEVICE FOR AN AUTOMATIC VENDING MACHINE

[75] Inventors: Takahiro Komori, Gunma; Kiyomitsu Higa, Maebashi, both of Japan

[73] Assignee: Sanden Corporation, Japan

[21] Appl. No.: 21,487

[22] Filed: Mar. 4, 1987

[30] Foreign Application Priority Data

Mar. 4, 1986 [JP] Japan .............................. 61-30814[U]

[51] Int. Cl.⁴ ............................................. G07F 11/00
[52] U.S. Cl. ..................................... 364/478; 364/186
[58] Field of Search ............... 364/478, 184, 185, 186; 371/19

[56] References Cited

U.S. PATENT DOCUMENTS

| | | | |
|---|---|---|---|
| 4,399,354 | 8/1983 | Schaeffer | 364/565 |
| 4,442,345 | 4/1984 | Mollier et al. | 235/380 |
| 4,553,211 | 11/1985 | Kawasaki et al. | 364/479 |
| 4,646,861 | 3/1987 | Kawato et al. | 364/426 |

FOREIGN PATENT DOCUMENTS

| | | | |
|---|---|---|---|
| 56-22148 | 3/1981 | Japan | 371/19 |
| 2046964 | 11/1980 | United Kingdom . | |
| WO83/04447 | 12/1983 | World Int. Prop. O. . | |

Primary Examiner—Jerry Smith
Assistant Examiner—Allen MacDonald
Attorney, Agent, or Firm—Banner, Birch, McKie & Beckett

[57] ABSTRACT

Control apparatus and method is disclosed for a processor controlled vending machine. The control device includes a trigger signal generating circuit for periodically generating a trigger signal. The processor is responsive to the trigger signal to compare the value of the program counter and stack pointer to predetermined limits. If the value of the program counter and stack pointer is within a predetermined range (i.e., the values of the program counter and stack pointer is within the predetermined limits) then the processor does not determine that a vending machine malfunction has occurred. If, however, the value of the stack pointer or the program counter is not within the predetermined range, then the processor determines that a malfunction has occurred and provides a port signal. A reset signal generating circuit is responsive to the port signal to provide a reset signal, which reset signal is used to reset the mechanical and electronic systems of the vending machine.

20 Claims, 2 Drawing Sheets

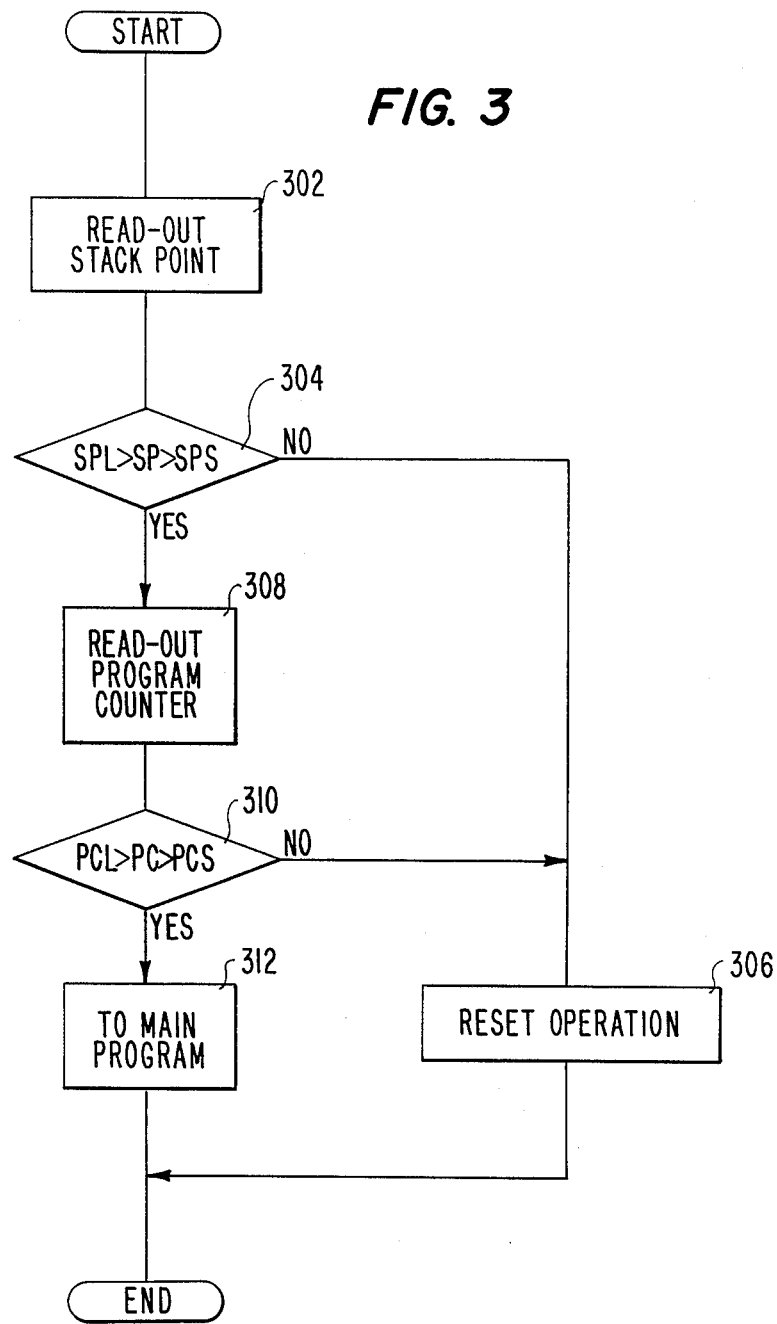

CONTROL DEVICE FOR AN AUTOMATIC VENDING MACHINE

BACKGROUND OF THE INVENTION

The present invention relates to a control device for an automatic vending machine, and more particularly, to an automatic reset mechanism for the control device of an automatic vending machine.

In recent years control of vending machines has been accomplished by providing a digital control device including a central processing unit (hereinafter referred to as a CPU). The CPU controls the dispensing and sales operation of the vending machine as well as recording useful sales information such as total amount of sales, amount of sales for each product, etc. However, due to various factors, the CPU may be caused to "runaway." The runaway condition may be caused by, e.g., failure of a mechanical system, noise causing an erroneous control signal, ect.

Such a runaway condition may be corrected to either manual or automatic reset of the control system. However, in the case of an automatic vending machine, manual reset is impractical. Therefore, it is necessary to provide an automatic reset mechanism for resetting the control system. Typical automatic reset mechanisms rely on monitoring the CPU operation for a predetermined time period to detect a runaway condition. These systems, however, suffer from the disadvantage of a time delay which is necessary to detect the runaway condition. As a result of this delay, it is possible that the control system may not be properly reset. Further, it is possible that the CPU software be reset and nonetheless the automatic vending machine will be inoperative due to the delay necessary to detect the runaway condition.

To resolve the above-mentioned disadvantages, it is desirable to provide a system wherein the time necessary to detect a runaway condition is minimized.

SUMMARY OF THE INVENTION

It is a primary object of the present invention to provide an improved control device for an automatic vending machine wherein detection of a runaway condition is easily accomplished.

It is another object of the present invention to provide an improved control device for an automatic vending machine wherein resetting of the control device is easily accomplished after detection of a runaway condition.

It is a further object of the present invention to provide an improved control system for an automatic vending machine wherein detection and correction of a runaway condition is easily accomplished without affecting the operation of the main program of the control device.

Accordingly, a control system for automatically resetting an automatic vending machine includes a trigger signal generating circuit for periodically generating a trigger signal. A data processor is provided for executing a control program to control the operation of the vending machine. The data processor is responsive to the trigger signal to determine whether a parameter of the control program is within a predetermined range and thereby determine whether a vending machine malfunction has occurred. If a malfunction has occurred, the processor provides a port signal. A reset signal generating circuit is adapted to respond to the port signal to provide a reset signal for resetting all mechanical and electronic systems of the vending machine.

A method according to the present invention includes the steps of periodically providing a trigger signal; responding to the trigger signal to determine whether a parameter of the control program is within a predetermined range and, if so, determining that no vending machine malfunction has occurred and, if not, determining that a vending machine malfunction has occurred; and resetting all mechanical and electronic systems when a malfunction has occurred.

BRIEF DESCRIPTION OF THE DRAWINGS

Subject matter which is regarded to be invention is particularly pointed out and distinctly claimed in the numbered paragraphs appended hereto. The invention, both as to organization and method of practice, may best be understood from a reading of the following detailed description in which:

FIG. 3 is a flow-chart illustrating the operation of the control device of FIG. 1.

DETAILED DESCRIPTION OF THE PREFERRED EMBODIMENT

Figure 1:
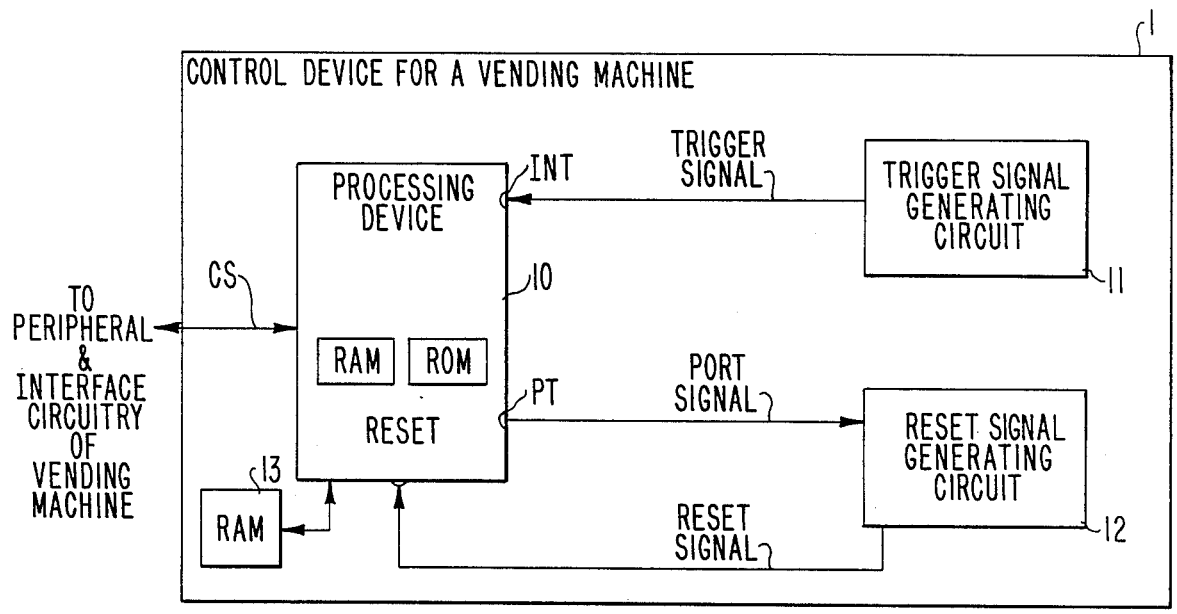
FIG. 1 is a block diagram of a control device in accordance with one embodiment of the subject invention.

A control device for an automatic vending machine 1 in accordance with one embodiment of the subject invention includes a central processing unit (CPU) 10, shown in FIG. 1, for controlling the operation of an automatic vending machine (not shown). CPU 10 includes random access memory (RAM) or read only memory (ROM) for storing program information related to the operation of the vending machine. CPU 10 includes additional random access memory 13 for storing sales information related to operation of the vending machine, e.g., total amount of sales, number of sales of each product, peak period of sales on a daily basis, etc. As used in a automatic vending machine, CPU 10 would typically be coupled to peripheral and interface circuitry (not shown) for controlling the operation of various mechanical systems of the vending machine and receiving data for storage. As an example, CPU 10 would be adapted to control the operation of the dispensing mechanism, the temperature of the vending machine, hours of operation of the vending machine etc.

CPU 10 may comprise any data processing apparatus, including the necessary peripheral circuitry, for performing the above mentioned functions. Additionally, CPU 10 must comprise the necessary circuitry for performing the malfunction determination function as described herein. As an example, CPU 10 may comprise a microprocessing device as is known in the art. It will be apparent to those skilled in the art that many other digital and/or analog circuits may be provided for performing the functions of CPU 10.

As shown in FIG. 1, CPU 10 is coupled to a trigger signal generating circuit 11. Trigger signal generating circuit 11 is adapted to periodically provide a trigger signal to CPU 10. The trigger signal comprises a series of pulses which are provided at predetermined intervals. In the preferred embodiment, the pulses of the trigger signal are provided at 20 microsecond intervals.

Each pulse of the trigger signal comprises an interrupt when received by CPU 10. CPU 10 is adapted to respond to each interrupt to provide an output signal indicative of its program operation, as will be described more fully hereinbelow.

Trigger signal generating circuit 11 may comprise any digital or analog circuitry for providing the trigger signal. Although the present embodiment is described by reference to a trigger signal which is provided at 20 microsecond intervals, it will be apparent to those skilled in the art that intervals of longer or shorter duration may be provided. Also, while the intervals between pulses is described a trigger signal at intervals of varying duration, as will be described more fully below.

Figure 2:
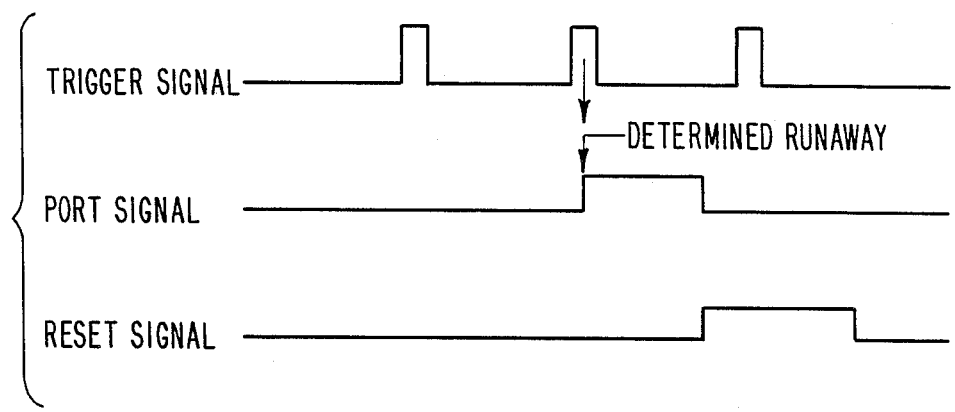
FIG. 2 is a time chart illustrating several control signals of the subject invention.

CPU 10 is also coupled to a reset signal generating circuit 12. The reset signal generating circuit 12 is responsive to a port signal received from CPU 10 for providing a reset signal to the CPU. An explanation of how the port signal is provided from CPU 10 will be provided below with reference to FIG. 3. The reset signal is used by CPU 10 to reset the entire circuitry (mechanical and electronic) via connection CS to circuits of the vending machine. Reset signal generating circuit 12 may comprise any digital or analog circuitry for providing the reset signal as shown in FIG. 2 and described herein.

With reference to FIG. 3, the manner in which CPU 10 determines that a runaway condition exists will be explained. FIG. 3 comprises a decisional flow diagram which illustrates the group of instructions that are executed by CPU 10 in response to each trigger signal received from trigger signal generating circuit 11. In operation, CPU 10 executes a control program to control the operation of the vending machine, as described above. Further, as described above, trigger signal generating circuit 11 periodically provides a trigger signal which comprises an interrupt INT to CPU 10.

After receipt of the triggering signal, CPU 10 first reads the actual value of its stack pointer (SP), step 302. Thereafter, the CPU compares the actual stack pointer position SP to the lower limit and higher limit stack pointers (SPS and SPL, respectively), step 304, to determine whether the actual value of the stack pointer is between its lower and higher limits. The upper and lower limits of the stack pointer may be recorded in a lookup table stored in the memory of CPU 10. If the actual value of the stack printer is not between its predetermined upper and lower limits, then the CPU determines that a runaway condition exists and via port PT provides the port signal to reset signal generating circuit 12 (FIGS. 1 and 2) such that the reset operation can commence, step 306.

If the actual value of the stack pointer is between its predetermined minimum and maximum values, then CPU 10 reads the actual value of the program counter (PC) (which may also be stored in a lookup table), step 308, and compares this value to the upper and lower limits of the program counter (PCL and PCS, respectively), step 310. Again, if the actual value of the program counter is beyond its limits, then CPU 10 provides the port signal to reset signal generating circuit 12 such that the reset operation can begin. If, however, the program counter is between its higher and lower limits, then CPU 10 returns to the main program, step 312.

In accordance with the above described method, CPU 10 insures that the vending machine is not malfunctioning by determining that the control program is proceeding to various steps at a predetermined rate.

The rate at which the program is proceeding is checked by insuring that the program is performing a certain step (within a predetermined range) at each interrupt. To this end, a lookup table may be provided which correlates the step(s) that the program should be executing with the particular interrupt received. CPU 10 is thus adapted to index each interrupt such that the proper upper and lower limits (range) of the program counter and stack pointer can be retrieved from the lookup table.

Alternatively, the CPU may determine the new range (for the next interrupt) while processing the present interrupt. In such an embodiment, it will be necessary to provide an algorithm for determining the new range. Also, considering that certain control functions, and hence program steps, require input from a vending machine consumer and therefore may include a variable execution time, it may be desireable to provide the triggering signal at intervals of varying duration.

While only several presently preferred embodiments of the subject invention have been described in detail herein, it will be apparent to those skilled in the art that many modifications and variations may readily be provided without departing from the true scope and spirit of the invention. It is the intent of the inventors, by the claims appended hereto, to cover all such variations and modifications.

We claim:

1. A control device for automatically resetting an automatic vending machine comprising:
   trigger signal generating means for periodically providing a trigger signal;
   data processing means for executing a control program to control the vending machine, said data processing means comprising interrupt means responsive to the trigger signal for determining whether a parameter of the control program is within a predetermined range and thereby determining whether a vending machine malfunction has occurred, said processing means further comprising means for providing a port signal when a vending machine malfunction has occurred; and
   means responsive to the port signal for generating a reset signal to reset mechanical and electronic devices of the vending machine.

2. A control device as recited in claim 1 wherein the parameter is a control program counter value and said data processing means further comprises means for comparing the value of the control program counter to predetermined upper and lower program counter limits and for determining whether the control program counter is within a predetermined range and, if so, for further determining that no vending machine malfunction has occurred and, if not, for determining that a vending machine malfunction has occurred and for providing the port signal.

3. A control device as recited in claim 2 further comprising memory means for storing a lookup table which contains a plurality of upper and lower program counter limits, said processing means further comprising means for indexing each received trigger signal and for retrieving an upper and lower program counter limit from said memory means corresponding to an index value.

4. A control device as recited in claim 2 wherein said processing means further comprises means for determining a new set of upper and lower program counter limits, for use in response to a subsequent trigger signal, from the value of the control program counter.

5. A control device as recited in claim 2 wherein said data processing means further comprises means for comparing the value of a control program stack pointer to predetermined upper and lower stack pointer limits and means for determining whether the control program stack pointer is within a predetermined range and, if so, for further determining that no vending machine malfunction has occurred and, if not, for determining that a vending machine malfunction has occurred and for providing the port signal.

6. A control device as recited in claim 5 further comprising memory means for storing a lookup table which contains a plurality of upper and lower stack pointer and program counter limits, said processing means comprising means for indexing each received trigger signal and for retrieving an upper and lower stack pointer limit and an upper and lower program counter limit from said memory means corresponding to an index value.

7. A control device as recited in claim 5 wherein said processing means further comprises means for determining a new set of upper and lower stack pointer limits and upper and lower program counter limits, for use in response to a subsequent trigger signal, from the values of the control program stack pointer and the control program counter respectively.

8. A control device as recited in claim 2 wherein said trigger signal generating means comprises means for providing the trigger signal at intervals of varying duration.

9. A control device as recited in claim 1 wherein the parameter is a stack pointer value and said data processing means further comprises means for comparing the value of the control program stack pointer to predetermined upper and lower stack pointer limits and for determining whether the control program stack pointer is within a predetermined range and, if so, for further determining that no vending machine malfunction has occurred and, if not, for determining that a vending machine malfunction has occurred and for providing the port signal.

10. A control device as recited in claim 9 further comprising memory means for storing a lookup table which contains a plurality of upper and lower stack pointer limits, said processing means further comprising means for indexing each received trigger signal and for retrieving an upper and lower stack pointer limit from said memory means corresponding to an index value.

11. A control device as recited in claim 9 wherein said processing means further comprises means for determining a new set of upper and lower stack pointer limits, for use in response to a subsequent trigger signal, from the value of the control program stack pointer.

12. A control device as recited in claim 1 wherein said trigger signal generating means comprises means for providing the trigger signal at intervals of constant duration.

13. A method for resetting a processor controlled vending machine when a malfunction has occurred comprising the steps of:
    (a) periodically providing a trigger signal;
    (b) responding to the trigger signal by determining whether a parameter of a control program is within a predetermined range and, if so, determining that no vending machine malfunction has occurred and, if not, determining that a vending machine malfunction has occurred;
    (c) providing a reset signal when a malfunction has been determined to have occurred; and
    (d) responding to the reset signal to reset mechanical and electronic systems of the vending machine.

14. The method as recited in claim 13 further comprising the steps of:
    (e) providing a lookup table which contains a plurality of parameter ranges;
    (f) indexing the lookup table responsive to each received trigger signal; and
    (g) correlating a particular parameter range to each received trigger signal to determine if the control program is within the particular range.

15. The method as recited in claim 14 wherein the control program parameter is the value of a stack pointer.

16. The method as recited in claim 13 further comprising the step of responding to each received trigger signal by determining the next parameter range from the value of the control program parameter.

17. The method as recited in claim 13 wherein the control program parameter is the value of a program counter.

18. The method as recited in claim 13 wherein the control program parameter is the value of a stack pointer.

19. The method as recited in claim 13, the control program counter parameter comprising two parameters, the value of a program counter and the value of a stack pointer.

20. The method as recited in claim 19, wherein after step (a), step (b) is initially performed with respect to the stack pointer value and, if no vending machine malfunction has occurred, step (b) is performed with respect to the program counter value.

* * * * *